United States Patent
Shiohara

(10) Patent No.: US 9,007,652 B2
(45) Date of Patent: Apr. 14, 2015

(54) PRINTING DEVICE AND METHOD OF PRODUCING PRINTING MATERIAL

(71) Applicant: Seiko Epson Corporation, Tokyo (JP)

(72) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 31 days.

(21) Appl. No.: 13/750,357

(22) Filed: Jan. 25, 2013

(65) Prior Publication Data

US 2013/0194594 A1 Aug. 1, 2013

(30) Foreign Application Priority Data

Jan. 31, 2012 (JP) ................. 2012-017838

(51) Int. Cl.
G06K 15/02 (2006.01)
B41J 2/21 (2006.01)
H04N 1/407 (2006.01)

(52) U.S. Cl.
CPC .......... G06K 15/1878 (2013.01); B41J 2/2107 (2013.01); G06K 15/1868 (2013.01); H04N 1/407 (2013.01)

(58) Field of Classification Search
None
See application file for complete search history.

(56) References Cited

U.S. PATENT DOCUMENTS

| | | | | |
|---|---|---|---|---|
| 2002/0060650 A1* | 5/2002 | Wakashiro et al. | ................ | 345/9 |
| 2005/0063606 A1* | 3/2005 | Kita | ................ | 382/260 |
| 2007/0201062 A1* | 8/2007 | Watanabe | ................ | 358/1.9 |
| 2008/0008349 A1* | 1/2008 | Binnig et al. | ................ | 382/100 |
| 2010/0253957 A1 | 10/2010 | Sano et al. | | |
| 2010/0265267 A1* | 10/2010 | Schaepe et al. | ................ | 345/619 |
| 2011/0090521 A1* | 4/2011 | Ohta et al. | ................ | 358/1.9 |
| 2011/0216372 A1* | 9/2011 | Adams | ................ | 358/3.01 |
| 2014/0125661 A1* | 5/2014 | Kurosaki et al. | ................ | 345/419 |

FOREIGN PATENT DOCUMENTS

JP 2004-050412 A 2/2004
JP 2010-253927 A 11/2010

* cited by examiner

*Primary Examiner* — Kimberly A Williams
(74) *Attorney, Agent, or Firm* — Global IP Counselors, LLP

(57) ABSTRACT

A basic color to be printed in achromatic colors (a layer superimposed with another layer) is changed in response to the brightness of a pixel indicated by the original image data.

17 Claims, 7 Drawing Sheets

| Image Data (Transmissivities) | Color Channels of Achromatic Colors (Transmissivities) | Color Channels of Chromatic Colors (Transmissivities) | Synthetic Transmissivity |
|---|---|---|---|
| 100.0 | 80.0 | 100.0 | 80.0 |
| ⋮ | ⋮ | ⋮ | ⋮ |
| 95.0 | 80.0 | 95.0 | 76.0 |
| ⋮ | ⋮ | ⋮ | ⋮ |
| 80.0 | 80.0 | 80.0 | 64.0 |
| ⋮ | ⋮ | ⋮ | ⋮ |
| 5.0 | 80.0 | 5.0 | 4.0 |
| ⋮ | ⋮ | ⋮ | ⋮ |
| 0.6 | 80.0 | 0.6 | 0.48 |
| ⋮ | ⋮ | ⋮ | ⋮ |
| 0.5 | 80.0 | 0.5 | 0.4 |
| 0.6 | 0.5 | 100.0 | 0.5000 |
| ⋮ | ⋮ | ⋮ | ⋮ |
| 0.5 | 0.5 | 83.42 | 0.4171 |
| ⋮ | ⋮ | ⋮ | ⋮ |
| 0.18 | 0.5 | 30.35 | 0.1518 |
| ⋮ | ⋮ | ⋮ | ⋮ |
| 0.01 | 0.5 | 2.158 | 0.0108 |
| ⋮ | ⋮ | ⋮ | ⋮ |
| 0.0 | 0.5 | 0.5 | 0.0025 |

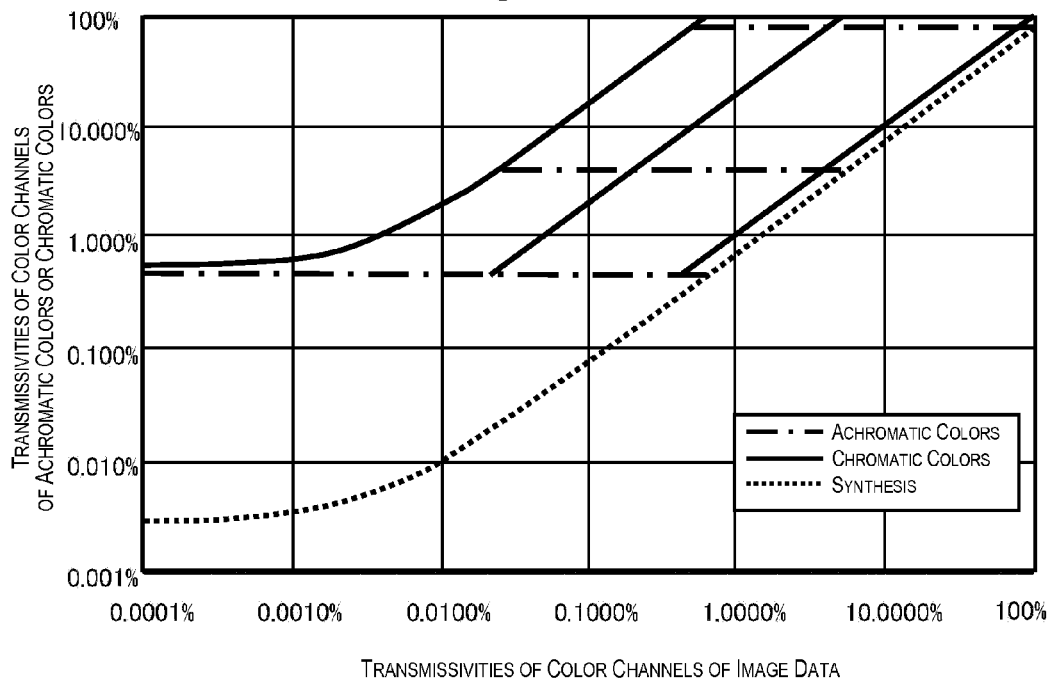
Fig. 7A
Fig. 7B
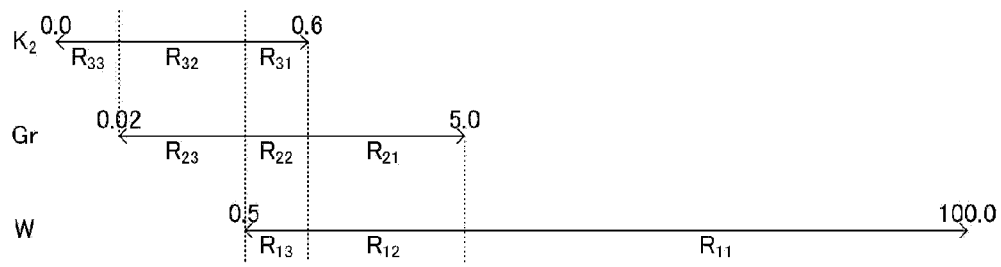
Fig. 7C

PRINTING DEVICE AND METHOD OF PRODUCING PRINTING MATERIAL

CROSS-REFERENCE TO RELATED APPLICATIONS

This application claims priority to Japanese Patent Application No. 2012-017838 filed on Jan. 31, 2012. The entire disclosure of Japanese Patent Application No. 2012-017838 is hereby incorporated herein by reference.

BACKGROUND

1. Technical Field

The present invention relates to a printing device that stores a color material in a plurality of layers.

2. Background Technology

Various techniques have been known to print color materials in a plurality of layers on a transparent print medium so as to obtain a printing material. For example, to form a layer having a white image and a layer having a color image, Patent Document 1 discloses a technique to have a white color mixed with a white ink and other color inks so as to print a desired white color in a case of printing an image including a part that exposes a white layer and a part that does not expose the white layer.

Japanese Laid-open Patent Publication No. 2010-253927 (Patent Document 1) is an example of the related art.

SUMMARY

Problems to be Solved by the Invention

In the well-known technique, there was no idea to change a basic color (a layer overlapped with another layer) that prints in achromatic colors in response to a brightness of a pixel indicated by the original image data, and also, it was not assumed to obtain a printing material in a wide dynamic range. For example, there was no idea to obtain a print material in a wide dynamic range by using a deep color of the achromatic colors in the basic color.

Means Used to Solve the Above-Mentioned Problems

In the invention, a basic color (a layer overlapped with another layer) that prints in achromatic colors is changed in response to a brightness of a pixel indicated by an original image data. Also, the first print data and the second print data are produced based on the image data, the first print layer is printed by color materials of the achromatic colors by controlling a printing section based on the first print data, and the second print layer is printed by using color materials by controlling the printing section based on the second print data. In this configuration, in a case that the first print data is produced, when a brightness of the first pixel indicated by the image data is included in the first brightness region and a brightness of the second pixel is included in the second brightness region which is darker than the first brightness region, the first print data is produced so that the brightness of the first print layer corresponding to the first pixel is brighter than the brightness of the first print layer corresponding to the second pixel.

That is, the first brightness region and the second brightness region, which is darker than the first brightness region, are defined by the brightness of the pixels indicated by the original data. When the first print layer corresponding to the first pixel in the first brightness region and the first print layer corresponding to the second pixel in the second brightness region are compared, it has a configuration that the former case is brighter. By this configuration, the dark pixel can be realized as darker that compares in a case that the white ink is printed as the first print layer corresponding to a dark pixel in the original image data. Accordingly, it is possible to obtain a wide dynamic range of the printing materials.

Here, in the print data production section, it produces the first print data and the second print data. When the first print data is produced, it prefers that the brightness of the first print layer printed by the first print data in response to the brightness of each pixel indicated by the image data is adjustable. And, in a case that the brightness of the first pixel indicated by the image data is included in the first brightness region, and the brightness of the second pixel is included in the second brightness region which is darker than the first brightness region, to become the brightness of the first print layer corresponding to the first pixel which is brighter than the brightness of the first print layer corresponding to the second pixel, the brightness of the first print layer can comply with the brightness change of the pixels in the first brightness region and the second brightness region, or it can stay constant. That is, it can have a configuration that as the brightness of each pixel indicated by the image data is larger, the brightness of the first print layer becomes larger, or it can have a configuration that as the brightness of each pixel indicated by the image data is larger, the brightness of the first print layer becomes larger in a step-by-step manner. Also, it can form a plural number of the brightness regions having smaller and larger relationships such as the first brightness region and the second brightness region, a minimum brightness value of the first brightness region and a maximum brightness value of the second brightness region can be adjacent to each other, or the values can be apart from each other.

The first print data is a data that forms the first print layer printed by using at least the color materials of the achromatic colors in the printing section so that the brightness of the first print layer can be adjusted by the first print data. Accordingly, for example, when the plural colors of the color materials of the achromatic colors are printable in each pixel, it can have a configuration that the usage of the color materials in each color is identified by the first print data. When one color of the color materials of the achromatic colors is printable in each pixel, it can have a configuration that among the plural colors of the color materials of the achromatic colors, a color of the color materials that should be printed is identified by the first print data.

The second print data is a data to form the second print layer printed by using the color materials (it is preferable to include the plural colors including chromatic colors) in the printing section. An image indicated by the image data can be printed by the user who simultaneously viewed the first print layer and the second print layer. Accordingly, in a situation that the brightness of the printing material is adjusted by the first print layer, the brightness, the hue, the colorfulness are also adjusted by the second print layer so as to adjust a color of each pixel. Obviously, the print results based on the first print data and the second print data reproduces the colors of the image indicated by the image data, but the reproduction of the colors can be performed properly (color management can be performed), or the emphasis such as a gamut mapping can be performed with the reproducibility of the colors as secure as possible. By the way, the color materials printed by the second print data can include the chromatic colors, and it can be configured by the chromatic colors only or it can be configured by the chromatic colors and the achromatic colors.

The print control section controls the printing section based on the first print data and the second print data so that the first print layer and the second print layer can be printed. The second print layer can be printed after the first print layer was printed on a print medium, or the first print layer can be printed after the second print layer was printed. Also, the printing section can have a configuration with the printing device in an integrated fashion, or it can have a configuration as a separated body. In addition, it is preferable that the print medium is transparent so as to improve a widening effect of the dynamic range.

In addition, it can have a configuration that when a plurality of the color materials of the achromatic colors having a different brightness is printable in the printing section, the first print data, which identifies the achromatic colors that should be printed in each pixel, is produced so that the brightness of the color materials of the achromatic colors printed in the first pixel becomes brighter than the brightness of the color materials of the achromatic colors printed in the second pixel. That is, a plural color of the color materials of the achromatic colors is printable in the printing section, and when it is possible to print any one color of the color materials of the achromatic colors in respective pixels, the brightness of the pixels in the first print layer can be adjusted by selecting a color of the color materials (brightness) printed in the respective pixels. And, normally, the number of colors of the color materials that can be used in the printing section is fewer than the number of gradations of the image data. Because of this, to adjust the brightness of the first print layer in this configuration, a color of the color materials printed in the first print layer needs to be changed in a step-by-step manner for the brightness change of the image data. And, it can have a configuration that the color materials of the achromatic colors that should be printed in the respective pixels are identified so that the brightness of the color materials of the achromatic colors printed in the first pixel becomes brighter than the brightness of the color materials of the achromatic colors printed in the second pixel, and the pixels having the brightness included in the first brightness region are printed in a brighter color than the pixels having the brightness included in the second brightness region. It has a configuration to change a color that should be printed in multiple steps in each brightness region. As a result, it is possible to easily identify a color that should be printed in the respective pixels.

Furthermore, the colors in the pixels indicated by the image data convert into the chromatic colors and the achromatic colors, and it has a configuration that the first print data that specifies the amount of the color materials (amount of the color materials of the achromatic colors) to print out the achromatic colors after the conversion and the second print data that specifies the amount of the color materials (for example, the amount of the plural colors of the color materials including the chromatic colors) to print out the chromatic colors after the conversion are produced. That is, it has a configuration that the colors in the pixels indicated by the image data convert into the chromatic colors and the achromatic colors based on the correspondence relationship which has been preliminary set. By this configuration, the first print data and the second print data can be produced to reproduce the correspondence relationship of the colors which has been preliminary set. By the way, to become a wide dynamic range, the correspondence relationship of the colors can be preliminary set so that when the pixels indicated by the image data are dark, the first print layer becomes darker, and when the pixels are bright, the first print layer becomes brighter. For example, it can be set by the LUT or the function.

Also, for example, the correspondence relationship is defined by corresponding to a brightness range of the colors in the pixels indicated by the image data and a brightness range, which realizes a color by the combination of the color materials of the achromatic colors and the plural colors of the color materials including the chromatic colors. Thus, the correspondence relationship of the colors around the time of the conversion is defined. The correspondence relationship of the colors can be defined so as to analogize the hue or the colorfulness before and after the conversion with keeping the correspondence relationship of the brightness range. That is, the brightness range after the conversion corresponds to a dynamic range such as a brightness range, which realizes a color by the combination of the color materials of the achromatic colors and the plural colors of the color materials including the chromatic colors, so that the correspondence relationship can be defined such that the brightness of the color after the conversion can be obtained from a maximum value of the brightness to the minimum value of the brightness in the dynamic range.

By the way, when the correspondence relationship is defined as described in the example, it is preferable that the first print data that corresponds to the colors of the pixels indicated by the image data is determined first. That is, the color materials printed by the first print data are the achromatic colors and the color materials printed by the second print data are the plural colors including the chromatic colors so that the correspondence relationship can be easily defined because the change in the color materials printed by the first print data is only the brightness. And, when the first print data was determined, among the number of the data to be applied for the second print data, it is possible to select the second print data by selecting the data that satisfies limitations such as the reproducibility of the colors or the gamut mapping related to the picture. Obviously, after predetermining the correspondence relationship of the image data, the first print data, and the second print data, the color measurement is performed by printing a patch in the predetermined data, and the correspondence relationship can be defined by adjusting the predetermined correspondence relationship based on the value of the color measurement.

Further, as an example, it has a configuration that the first print data corresponding to the colors of the pixels indicated by the image data is determined in first. It can adopt a configuration that the first print data that prints the color materials of the achromatic colors is determined by performing a conversion in the look-up table based on the image data, and in addition, based on the conversion result and the image data, the second print data that prints the plural colors of the color materials including the chromatic colors is determined by performing a conversion in the look-up table.

Concretely, the look-up table that indicates the correspondence relationship of the transmissivities of respective color channels of the pixels indicated by the image data, the transmissivities of the color channels of the achromatic colors that indicate colors printed on the first print layer, and the transmissivities of the color channels of the chromatic colors that indicate colors printed on the second print layer is preliminary provided. And, it has a configuration that among the color channels of the pixels indicated by the image data, the transmissivity of the brightest color channel is converted based on the look-up table so that the transmissivities of the color channels of the achromatic colors are identified for the pixels. In this case, the data that is provided to print the color materials of the achromatic colors having the identified transmissivities becomes the first print data. For example, in the printing device that uses the printing section which can print the plural colors of the color materials of the achromatic colors, the transmissivities of the color materials in each color is preliminary identified, and the look-up table is defined by that whichever transmissivities of the color materials of the achromatic colors of the respective colors correspond to an arbitrary transmissivity of the brightest color channel. In this configuration, based on the look-up table, it identifies whichever color materials of the plural colors that should be printed so that the first print data that identifies whichever color materials of the plural colors is produced. By the way, in a configuration that the ink printed on the first print layer is one color, if the brightness of the ink is bright color, the range of the brightness to be realized is wider compare to when the ink is dark color. Accordingly, by identifying the transmissivity of the color channel of the achromatic color that corresponds to the brightest color channel among the color channels of the image data, the printing material can be printed in a dynamic range as wide as possible.

The first print data that prints the color materials of the achromatic colors is produced, and in addition, it has a configuration that the transmissivities of the color channels of the chromatic colors for the pixels are identified by converting the transmissivities of the respective color channels of the pixels indicated by the image data based on the look-up table. That is, by reviewing the look-up table, the transmissivities of the color channels of the chromatic colors corresponding to the combination of the transmissivities of the respective color channels of the image data and the transmissivities of the color channels of the achromatic colors can be identified because the transmissivities of the color channels of the achromatic colors have already been identified. And, when the transmissivities of the respective channels of the chromatic colors are identified, the data indicates the amount of the color materials that should be printed when the chromatic colors having the identified transmissivities are reproduced by the plural colors of the color materials including the chromatic colors so that the data is the second print data. By the way, the transmissivity is a value that evaluates the density of each color material when the color materials are printed on a transparent print medium, and obviously, the transmissivities can be realized by a gradation value.

Further, it is preferable that the first print layer is printed on the entire print region of the image data. That is, it has a configuration that the first print layer of the achromatic colors is formed on the entire position corresponding to the image indicted by the image data. The color materials of the plural colors including the chromatic colors are not printed in the brightest portion because as the printing device prints the color materials in the ordinal color materials, the brightness decreases. However, when printing on a transparent print medium, if there is a portion that the color materials are not printed, the portion becomes transparent. Thus, it has a configuration that the first print layer is printed on the entire print region of the image data so that the print material that does not form a transparent portion can be provided.

Further, when the first print layer is printable by changing the thickness of the color materials in each position of the printing section, it can have a configuration that the first print data is produced to indicate the amount of the color materials of the achromatic colors that should be printed in each pixel so that the thickness of the color material of the achromatic color printed in the first pixel is thinner than the thickness of the color material of the achromatic color printed in the second pixel. That is, the color materials printed on the first print layer are the achromatic colors so that when the thickness of the color material is adjusted in each position, the brightness of the first print layer can be adjusted. By the way, if the amount of the color materials is adjusted to increase the thickness of the first print layer for the pixels in accordance with the increase of the brightness of the color in the pixels indicated by the image data, it can be easy to become darker in the dark pixels. Also, the thickness of the color material increases in accordance with the increase of the brightness of the color in the pixels indicated by the image data, but the thickness change corresponding to the increase of the brightness can be a monotone increasing or a step-by-step increasing.

Further, the invention for printing the first print layer and the second print layer on the print medium based on the first print data and the second print data is realized as the invention of the production method for producing the printing material including the first print layer and the second print layer printed on the print medium.

Further, as described in the invention, when the brightness of the first pixel indicated by the image data is included in the first brightness region and the brightness of the second pixel is included in the second brightness region which is darker than the first brightness region, the printing device that makes the brightness of the first print layer for the first pixel brighter than the brightness of the first print layer for the second pixel can be realized as the invention of the printing method or the printing program. Also, the printing device, the printing method, and the printing program as discussed above can be realized by a single device or by using a shared part in a device having multiple functions so that the various aspects can be included.

BRIEF DESCRIPTION OF THE DRAWINGS

Referring now to the attached drawings which form a part of this original disclosure:

FIG. 7A shows an example of the first LUT when the first print layer is formed by three color inks, FIG. 7B shows a correspondence relationship of a transmissivities indicated by the first LUT, and FIG. 7C is a schematic drawing showing a range of the transmissivities of the image data in the first LUT.

DETAILED DESCRIPTION OF EXEMPLARY EMBODIMENTS

Figure 1:
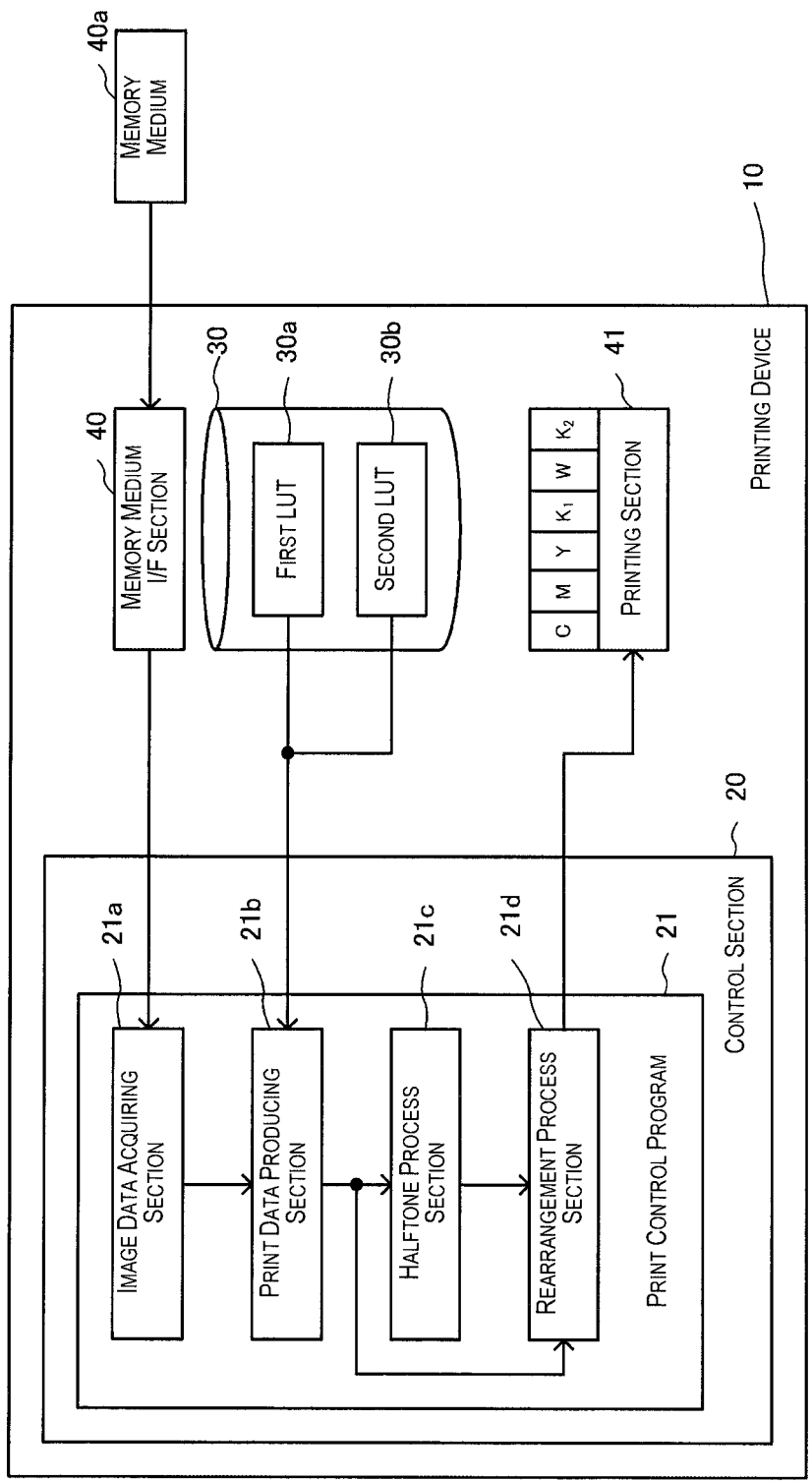
FIG. 1 shows a block diagram of a printing device according to the present embodiment.

Hereinafter, the embodiments of the invention will be explained in accordance with the following order.
(1) Configuration of the printing device
(2) Printing data production process
(3) Other embodiments
(1) Configuration of the Printing Device:

FIG. 1 is a block diagram showing a configuration of the printing device 10 according to the invention. The printing device 10 includes a control section 20 such as a RAM and a CPU, and a ROM 30. The control section 20 executes the printing control program stored in the ROM 30 so that the printing can be executed. That is, it is possible that the control section 20 prints ink on a print medium by controlling a printing section 41.

The printing section 41 of the printing device 10 according to the present embodiment includes print heads to discharge two types of inks such as $WK_2$ (W: White, $K_2$: Black) based on the first print data and to discharge four types of inks such as $CMYK_1$ (C: Cyan, M: Magenta, Y: Yellow, $K_1$: Black) based on the second print data. That is, the print heads discharge six types of inks such as $CMYK_1WK_2$. Also, the printing section 41 includes a carrying mechanism to carry a transparent print medium (for example, PET film having an ink absorbing layer, or the like), and during the conveyance of the print medium, the printing is performed by the respective heads in the order so that a printing material having the first print layer formed by the $WK_2$ inks and the second print layer formed by $CMYK_1$ inks can be produced. Here, $K_1$ ink and $K_2$ ink are the different types of inks, but it can be used as the same ink so that the print heads discharge five types of inks such as $CMYK_1W$. In this case, the two types of inks such as $WK_1$ are discharged based on the first print data, and the four types of inks such as $CMYK_1$ are discharged based on the second print data.

Figures 2A, 2B:
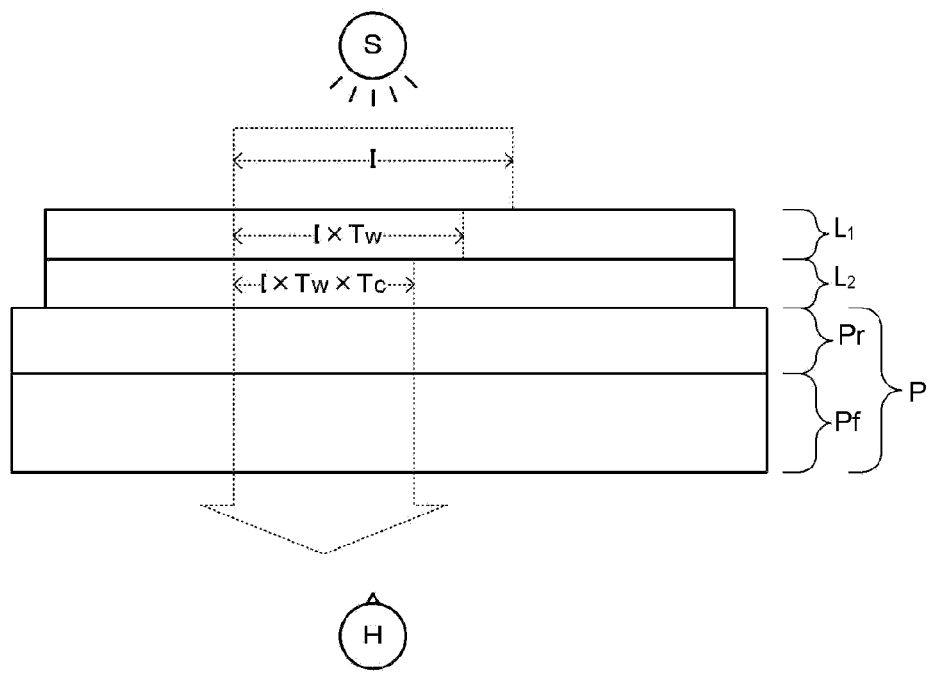
FIG. 2A is a schematic drawing showing a print medium and a print layer.
FIG. 2B shows the first LUT.

By the way, FIG. 2A is a schematic drawing showing a print medium P and the first print layer $L_1$ and the second print layer $L_2$ printed on the print medium P, and it shows a cross-sectional view of the print medium P. As shown in FIG. 2A, the print medium P includes a transparent PET film Pf as a base material and an ink absorbing layer Pr, and the ink as a color material is printed on the ink absorbing layer Pr. Also, in the present embodiment, the first print layer $L_1$ is printed after printing the second print layer $L_2$ to the ink absorbing layer Pr. And, in a situation that the print medium P is arranged between a light source S and an observer H, the print medium P is observed by the observer H. Obviously, the configuration shown in FIG. 2A is one example so that it can change such that the first print layer $L_1$ and the second print layer $L_2$ can be printed in a reverse order, and the front and back surfaces in an observation direction from the observer H can be turned upside down.

The control section 20 acquires an image data from a memory medium 40a inserted in a memory medium I/F section 40 by a print control program 21, and the printing section 41 is controlled based on the image data so that the image is printable on the print medium P. Also, in the present embodiment, when the brightness of the first pixel indicated by the image data is brighter than the brightness of the second pixel, the control section 20 produces the first print data and the second print data to control the brightness of the first print layer for the first pixel which is brighter than the brightness of the first print layer for the second pixel, and the printing is executed based on the first print data and the second print data.

Because of this, the print control program 21 has an image data acquiring section 21a, a print data producing section 21b, a halftone process section 21c, and a rearrangement process section 21d. An image indicated by the image data stored in the memory medium 40a is selected and designated as a print target by controlling the user interface, which is not shown in the drawing, by the user so as to start the print control process based on the print control program 21.

Figure 3:
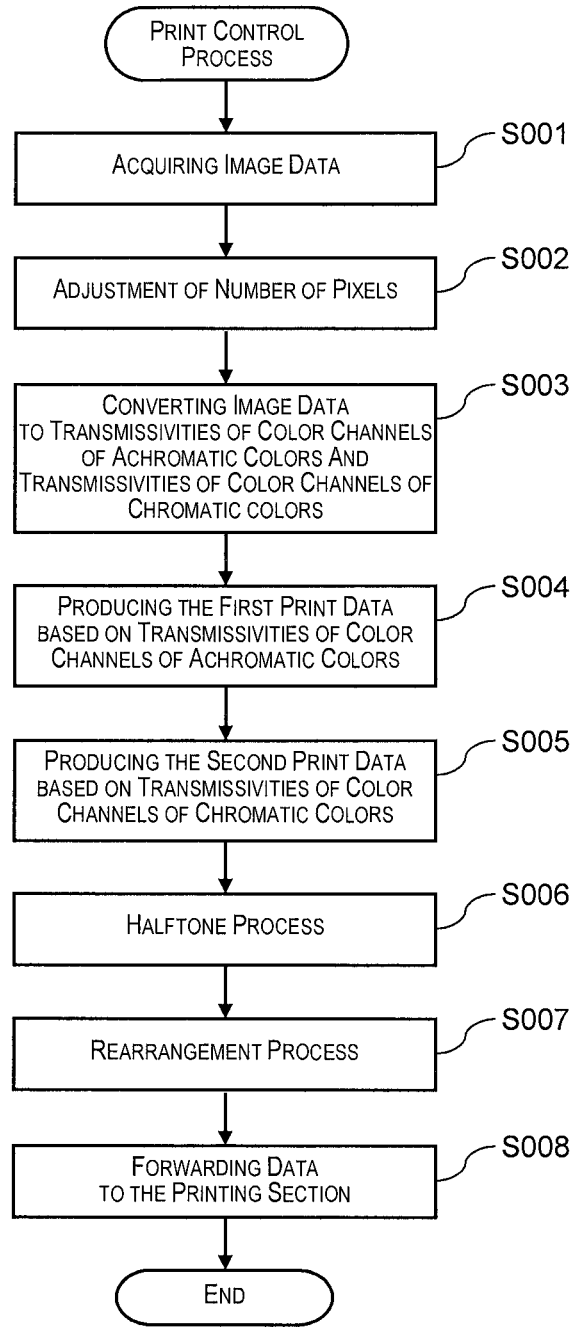
FIG. 3 shows a flowchart of the print control process.

FIG. 3 is a flowchart showing the print control process. In the print control process, by the image data acquiring section 21a, the print control section 20 acquires a designated image, which is indicated by the image data, as a print target from the memory medium 40a inserted in the memory medium I/F section 40 (Step S001), and the number of the pixels is adjusted to correspond to the number of pixels in the print size and the print resolution (Step S002). By the way, in the present embodiment, the image data is a RGB (R: Red, G: Green, B: Blue) data and the data is predetermined that the gradation value related to the respective color channels of the RGB is 14 bit in the respective colors in each pixel.

Also, the gradation value in the respective color channels of the RGB is set to change in response to the brightness of the color in each color channel so that when the gradation value in all of the RGB is 0, the color is black and when the gradation value in all of the RGB is 16383, the color is white. When it assumes that the ink in each color channel is printed on the transparent print medium P based on the gradation value which is indicated by the image data, it can be said that the amount of the ink changes in response to the gradation value. Thus, it can be said that the transmissivities of the color materials in the respective colors change in response to the gradation value. In the present embodiment, as the gradation value of the image data realized in 14 bit changes 0 to 16383, it is set that the transmissivity changes 0% to 100%. Obviously, the relationship between the gradation value and the transmissivity can be applied to the configuration defined as a γ curve. Because of this, the gradation value and the transmissivity are essentially equivalent to the amount so that hereinafter, in the present specification, the color conversion or the like will be explained by using the transmissivity.

Next, by the process in the print data producing section 21b, the control section 20 converts the transmissivities indicated by the image data to the transmissivities of the color channels of the achromatic colors and the transmissivities of the color channels of the chromatic colors based on the first LUT 30a which is preliminary stored in the memory medium 30 (Step S003). By the way, the color channels of the achromatic colors are the color channels to specify the amount of inks ($WK_2$ inks) printed by the first print data, and the color channels of the chromatic colors are the color channels to specify the amount of inks ($CMYK_1$ inks: the plural colors of the color materials including the chromic color) printed by the second print data. In addition, by the process of the print data producing section 21b, the control section 20 produces the first print data to specify any one of $WK_2$ inks that should be printed in each pixel based on the transmissivities of the color channels of the achromatic colors (Step S004). Also, by the process of the print data producing section 21b, the control section 20 produces the second print data to convert the transmissivities of the color channels of the chromic colors to the data specifying the amount of $CMYK_1$ inks printed in each pixel by reviewing the second LUT 30b (Step S005).

In the present embodiment, the first LUT 30a is set for the correspondence relationship to convert the transmissivities of the color channels of the achromatic colors and the chromatic colors in response to the transmissivities of the image data in a brightness range to be realized when the $WK_1$ inks are printed on the first print layer and the $CMYK_1$ inks are printed on the second print layer. By using the dashed arrow, FIG. 2A schematically shows a situation of the light attenuation in a process of transmitting through the first print layer $L_1$ and the second print layer $L_2$ when the light output from the light source S reaches to the observer H. That is, in a case that the strength I of the light is output from the light source S, when the light is transmitted through the first print layer $L_1$, the strength I×Tw of the light, which is obtained by multiplying the transmissivity Tw of the color material constituting the first print layer $L_1$ to the light strength I, reaches to the second print layer $L_2$. In addition, when the strength I×Tw of the light is transmitted through the second print layer $L_2$, the strength I×Tw×Tc of the light, which is obtained by multiplying the transmissivity Tc of the color material constituting the second print layer $L_2$ to the light strength I×Tw, reaches to the ink absorbing layer Pr. And, the strength I×Tw×Tc of the light reaches to the observer H through the ink absorbing layer Pr and the PET film Pf. By the way, here, it assumes that the transmissivity of the ink absorbing layer Pr and the PET film Pf is 100%, but obviously, the transmissivity of the ink absorbing layer Pr and the PET film Pf can be smaller than 100%. In this case, the strength of the light, which multiplies the transmissivity of the ink absorbing layer Pr and the PET film Pf to the light strength I×Tw×Tc, reaches to the observer H.

Accordingly, if it assumes that the strength I of the light from the light source stays constant, the dynamic range of the image realized on the print medium is determined as Tw×Tc because Tw×Tc changes in accordance with the printed color materials. In the present embodiment, the color materials constituting the first print layer L1 can be two types of inks $WK_2$ so that the first print layer $L_1$ must be printed by one of the inks and the print region of the image data is filled with the inks without any space. Accordingly, in the present embodiment, the transmissivity of the first print layer $L_1$ is one of the transmissivity of the W ink (80% in the present embodiment) and the transmissivity of the $K_2$ ink (0.5% in the present embodiment). On the other hand, the color material can be printed or can not be printed on the second print layer $L_2$. Also, the maximum amount that can be printing is determined. Therefore, in the present embodiment, the maximum transmissivity of the second print layer $L_2$ is 100%, and the minimum transmissivity is the transmissivity when the maximum amount of the color material is printed (0.5% in the present embodiment). By the way, here, it explained in a case that the maximum value and the minimum value of the transmissivity in the respective colors are the same value, but the maximum value and the minimum value of the transmissivity in each color channel can be a different value. Obviously, the degree of the change of the transmissivity for the change of the gradation value (ink amount) in each color can be different.

The maximum of the transmissivity of the second print layer $L_2$ is 100% and the minimum of the transmissivity is 0.5% so that the dynamic range Tw×Tc when the W ink (transmissivity 80%) is printed on the first print layer $L_1$ in the present embodiment is 0.4% to 80% (80% of 0.5% to 80% of 100%), and the dynamic range Tw×Tc when the $K_2$ ink (transmissivity 0.5%) is printed on the second print layer $L_2$ is 0.0025% to 0.5000% (0.5% of 0.5% to 0.5% of 100%). Therefore, the brightness changes in a range of 0.025% to 80% of the light strength I in the printing device of the present embodiment.

Then, in the present embodiment, the transmissivities of the color channels of the achromatic colors corresponding to the transmissivity in each color channel of the image data and the transmissivities of the color channels of the chromatic color corresponding to the transmissivity in each color channel of the image data are defined by the first LUT 30a so as to change a color in the entire brightness range. By the way, here, the transmissivity in each color channel of the image data means a transmissivity corresponding to any of the gradation value of the RGB channels in the image data indicated by the designated image as a target print. The color channel transmissivities of the chromatic colors correspond to the transmissivities of the inks printed on the first print layer $L_1$. The transmissivities of the color channels of the chromatic colors correspond to the transmissivities of the inks printed on the second print layer $L_2$ so that the transmissivity in each color channel is defined. FIG. 2B shows the first LUT 30a according to the present embodiment. That is, the most left row and the second row from the left show the correspondence relationship between the transmissivity in each color channel of the image data and the transmissivities of the color channels of the achromatic colors, and the most left row, the second row from the left, and the third row from the left show the relationship that the combination of the transmissivity in each color channel of the image data and the transmissivities of the color channels of the achromatic colors correspond to the transmissivities of the color channels of the chromatic colors. By the way, by reviewing FIG. 2B, the most right side row shows a synthetic transmissivity of the second layer corresponding to the transmissivity in each color channel of the image data. Here, to fall the transmissivity of the acquired image data within the range of the synthetic transmissivity to be realized in the printing material, when the transmissivity of the acquired image data is x, the maximum value of the transmissivity of the acquired image data is $x_{max}$, the minimum value is $x_{min}$, the synthetic transmissivity is y, the brightest synthetic transmissivity to be realized is $y_{max}$, the darkest combination transmissivity to be realized is $y_{min}$, the first LUT 30a defines as $y=(x-x_{min})\times(y_{max}-y_{min})/(x_{max}-x_{min})$.

The color material used in the first print layer in the present embodiment is the W ink or the $K_2$ ink so that the first LUT 30a as shown in FIG. 2B shows that the transmissivity when the W ink is printed (80%) or the transmissivity when the $K_2$ ink is printed (0.5%) for the transmissivity in each color channel of the image data corresponds to the data in the second row from the left side. And, in the present embodiment, when the brightness of the first pixel indicated by the image data is included in the first brightness region $R_1$ (corresponding to a range of more than 0.6% and lower than 100%) and the brightness of the second pixel is included in the second brightness region $R_2$ (corresponding to a range of more than 0.0% and less than 0.5%) which is darker than the first brightness region $R_1$, the values in the first LUT 30a are defined such that the brightness of the first print layer corresponding to the first pixel is brighter than the brightness of the first print layer corresponding to the second pixel.

That is, in the first LUT 30a as shown in FIG. 2B, when the transmissivity in each color channel of the image data is included in the first brightness region $R_1$, the transmissivity of the color channel of the achromatic color is 80% for the transmissivity of the image data included in the first brightness region $R_1$. On the other hand, when the transmissivity of the image indicated by the image data is included in the second brightness region $R_2$, the transmissivity of the color channel of the achromatic color is 0.5% for the transmissivity of the image data included in the second brightness region $R_2$.

Also, in the present embodiment, the control section 20 specifies the brightest color channel from the color channels in each pixel of the image data so that the transmissivity of the color channel of the achromatic color is identified by converting the transmissivity of the brightest color channel based on the first LUT 30a. Accordingly, in arbitrary pixel of the image data, when the transmissivity of the brightest color channel is included in the first bright region $R_1$, the transmissivity of the color channel of the achromatic color is 80% based on the first LUT 30a, and when the transmissivity of the brightest color channel is included in the second bright region $R_2$, the transmissivity of the color channel of the achromatic color is 0.5% based on the first LUT 30a. And, the transmissivity of the color channel of the achromatic color is identified based on the first LUT 30a so that the ink for the printing with the transmissivity can be specified to any one of the W ink and the $K_2$ ink. Therefore, the control section 20 produces the first print data from the transmissivities of the color channels of the achromatic colors.

According to the conversion based on the first LUT 30a as described above, when the transmissivity of the brightest color channel is included in the first bright region $R_1$ among the color channels of the first pixel indicated by the image data and when the transmissivity of the brightest color channel is included in the second bright region $R_2$ among the color channels of the second pixel indicated by the image data, it is converted such that the transmissivity of the color channel of the achromatic color for the first pixel is larger than the transmissivity of the color channel of the achromatic color for the second pixel. Accordingly, in the first print layer, the brighter color material is printed in a pixel in which the transmissivity of the brightest color channel is included in the first bright region $R_1$ than a pixel in which the transmissivity of the brightest color channel is included in the second bright region $R_2$. By the way, in the first LUT 30a according to the present embodiment, for the transmissivity (transmissivity 0.5% to 0.6%) in each color channel of the image data included the bright regions $R_3$, $R_4$ located between the first bright region $R_1$ and the second bright region $R_2$, 80% and 0.5% are respectively coordinated as the transmissivities of the color channels of the achromatic colors. More detail about the conversion in a case that the transmissivity of the pixel indicated by the image data is included in the brightness regions $R_3$ and $R_4$ will be explained later.

When the transmissivity of the color channel of the achromatic color is determined based on the first LUT 30a, by review the first LUT 30a, the control section 20 determines the color channel of the chromatic color corresponding to the combination of the transmissivity in each color channel of the image data and the transmissivity of the color channel of the achromatic color, which is converted based on the first LUT 30a. For example, in the example shown in FIG. 2B, when the transmissivity of the color channel of the chromatic color is determined as 80% based on the first LUT 30a, the range of the above described first brightness region $R_1$, which is defined as a transmissivity of the image data in the first LUT 30a, is 0.6% to 100%. Accordingly, when the transmissivity of the image data is in a range of 0.5% to 10%, the control section 20 determines the transmissivity of the color channel of the chromatic color corresponding to the combination of the transmissivity of the image data, which is defined in the first LUT 30a, and the transmissivity of the color channel of the achromatic color so that it converts to the transmissivity of the color channel of the chromatic color which corresponds to the transmissivity of the image data. When the transmissivity in any color channel of the image data is outside range of 0.5% to 100%, the color channel of the chromatic color corresponding in the first LUT 30a is not defined so that the minimum value of the transmissivity of the color channel of the chromatic color (0.5% in FIG. 2B) is defined as the conversion result. By the way, the conversion is performed in the respective colors (RGB). Therefore, the color channel of the chromatic color after the conversion is the respective channels of the RGB.

As described above, when the transmissivities of the color channels of the achromatic colors and the transmissivities of the respective color channels of the chromatic colors are determined, the control section 20 produces the first print data to indicate any of the W$K_2$ inks that should be printed in each pixel based on the transmissivities of the color channels of the achromatic colors by the process of the print data producing section 21b. In the example shown in FIG. 2B, when the transmissivity is 80%, it determines that the W ink is used as the ink for the printing. When the transmissivity is 0.5%, it determines that the $K_2$ ink is used as the ink for the printing. In addition, by the process of the print data producing section 21b, the control section 20 produces the second print data that indicates the amount of the respective color inks of $CMYK_1$ in each pixel for the transmissivities of the respective color channels of the RGB by reviewing the second LUT 30b which is preliminary stored in the memory medium 30. That is, in the present embodiment, the second LUT 30b preliminary defines the correspondence between the combination of the transmissivities of the color channels of the chromatic colors and the combination of the gradation values of the $CMYK_1$ inks and it is stored in the memory medium 30 so that the control section 20 converts the transmissivities of the respective channels of the RGB to the gradation values (amount used) of the $CMYK_1$ inks by reviewing the second LUT 30b, and that is the second print data.

When the process of the print data producing section 21b is performed as described above, next, the control section 20 executes the halftone process by the process of the halftone process section 21c (Step S006). That is, the control section 20 produces data that indicates whether or not the ink droplet was discharged in each pixel based on the CMYK graduation values of the respective pixels indicated by the second print data.

Next, the control section 20 performs a rearrangement process to rearrange data after the first print data and the halftone process by the process of the rearrangement process section 21b (Step S007). That is, the control section 20 rearranges the respective pixels in accordance with the order of the print target. And, the control section 20 forwards the data, which is after the first print data and the halftone process in the order after the rearrangement process, to the printing section 41. As a result, the printing section 41 produces a printing material to form the first print layer and the second print layer by printing the ink on the print medium P.

In the configuration as described above, when the color channel of the achromatic color is the transmissivity (80%) of the W ink, the range that can be selected as the synthetic transmissivity is 04% to 80% as shown in FIG. 2B. When the color channel of the achromatic color is the transmissivity (0.5%) of the $K_2$ ink, the range that can be selected as the synthetic transmissivity is 0.0025% to 0.5% as shown in FIG. 2B. Therefore, the former case has a much wider range. Also, the range of the transmissivity of the image data corresponding to the former case has a much wider range. Accordingly, in the present embodiment, when the brightest color channel among the color channels of the image data is selected and the transmissivity of the brightest color channel is included in the first bright region $R_1$, it has a configuration to select the W ink so that the printing is performed in a wider range of the transmissivity.

Figure 4:
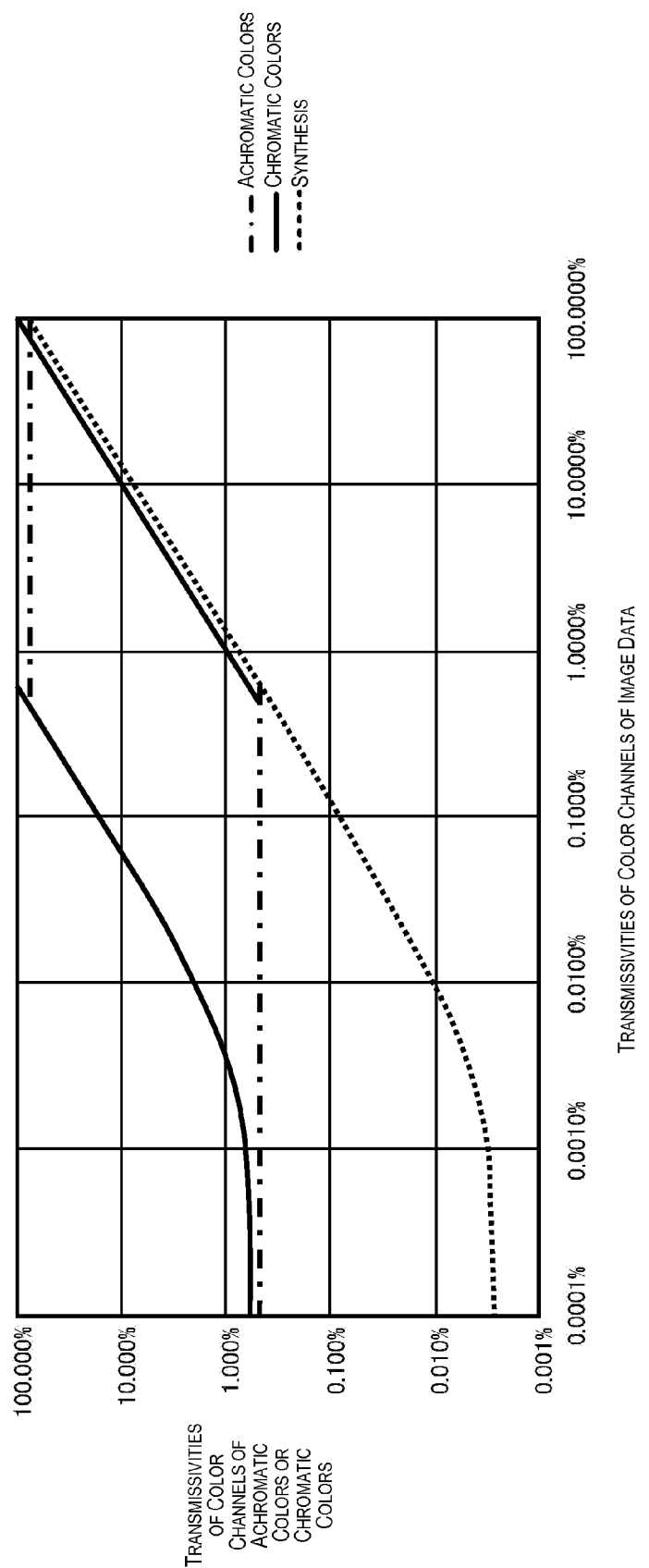
FIG. 4 shows a graph showing a correspondence relationship according to the first LUT.

Also, when the transmissivity of the brightest color channel of the pixel in the image data is included in the second bright region $R_2$, the brightness of the pixel is very dark. In this case, by selecting the $K_2$ ink, the extreme dark color, which was not realized when it was printed by the W ink, can be realized with a rich gradation. As a result, the printing material can be obtained with the wide dynamic range. By the way, FIG. 4 shows the double logarithmic graphs of the transmissivities of the color channels of the achromatic colors corresponding to the transmissivities of the color channels of the image data indicated by the first LUT 30a as shown in FIG. 2B, the transmissivities of the color channels of the chromatic colors, and both synthesized transmissivity. The alternate long and short dash line refers to as the color channel of the achromatic color, the solid line refers to as the chromatic color, and the dash line refers to as the synthesized transmissivity. As shown in FIG. 4, in the low brightness region selected by the $K_2$ ink, it is possible to express the dark color (lower limit value is 0.0025%) which is the wider range than the lower limit value of 0.4% in the synthetic transmissivity when it was printed by the W ink.

Figure 5:
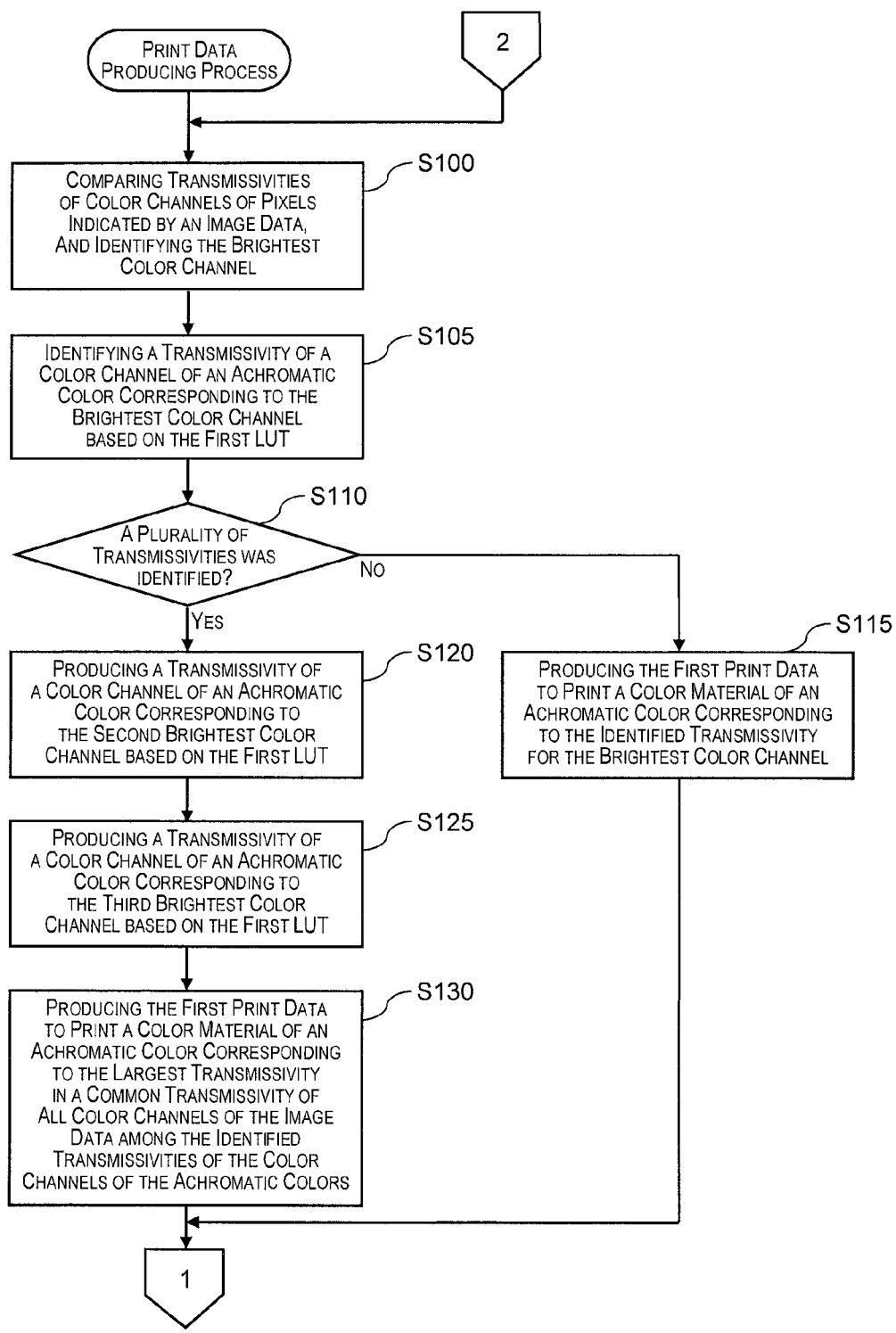
FIG. 5 shows a flowchart of a print data production process.
Figure 6:
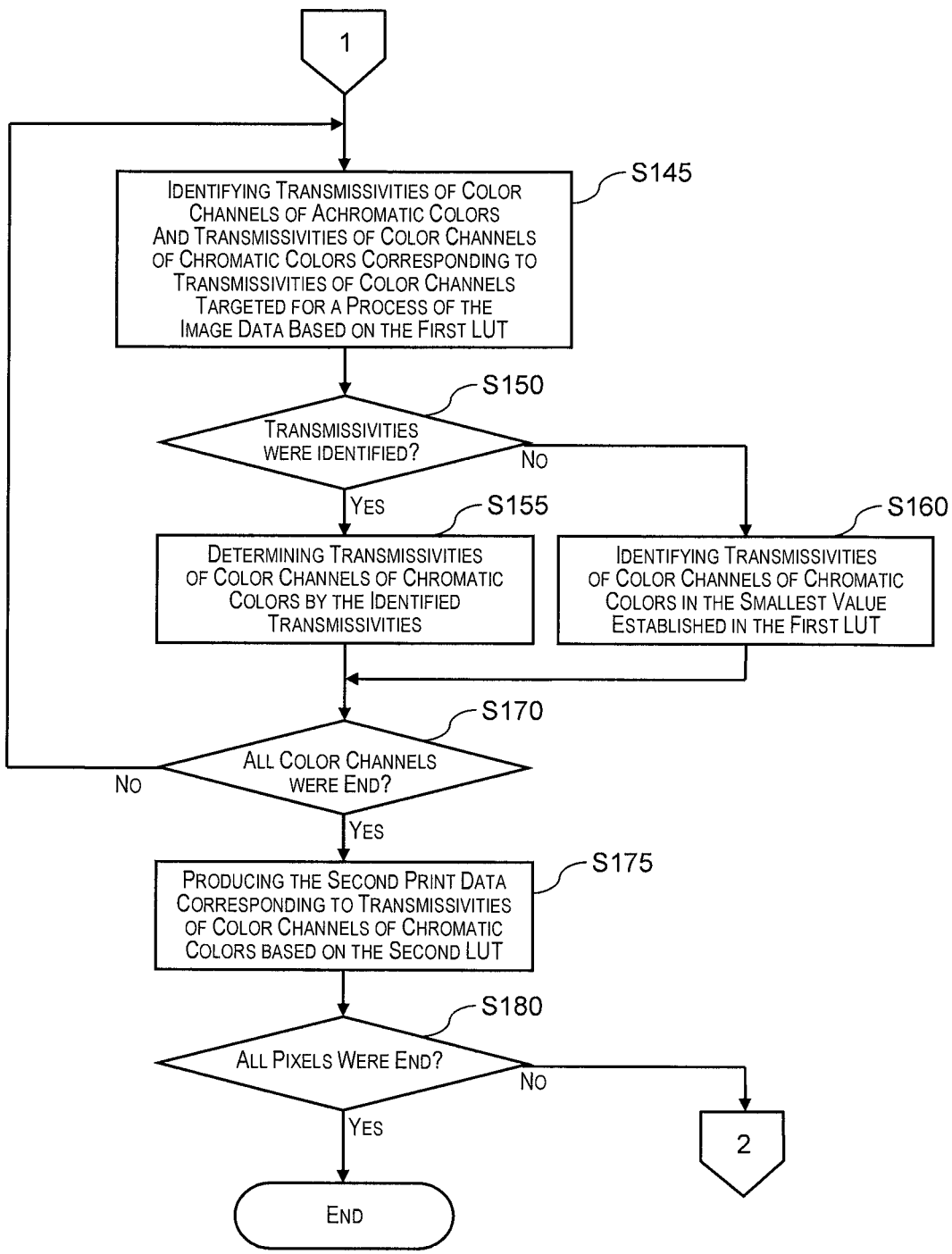
FIG. 6 shows a flowchart of a print data production process.

(2) Print Data Producing Process:

Next, the print data producing process (Steps S003 to S005 in the above) executed by the print data producing section 21b is explained in detail with a concrete example. FIGS. 5 and 6 are the drawings showing the printing data producing process. Here, as an example, it explains with that the transmissivity according to the image data in pixel A (Red color) is (R, G, B)=(95%, 5%, 0.18%), and the transmissivity in pixel B (dark green) is (R, G, B)=(0.01%, 0.6%, 0.18%). By the way, here, the color channel of the image data represents as a R channel, and the color channel of the chromatic color to define the ink amount to be printed by the second print data represents as a R' channel.

In the print data producing process, among the pixels that configure the image data, the control section 20 selects one pixel that the print data is not produced as a target for the process. And, the control section 20 compares the transmissivities of the color channels of the pixel targeted for the process, and the brightest color channel is determined (Step S100). For example, if the pixel A is a pixel targeted for the process, R channel in which the transmissivity is 95% is determined as the brightest color channel. If the pixel B is a pixel targeted for the process, G channel in which the transmissivity is 0.6% is determined as the brightest color channel.

Next, the control section 20 determines the transmissivity of the color channel of the chromatic color corresponding to the brightest color channel based on the first LUT 30a (Step S105). For example, if the pixel A is the target for the process, based on the first LUT 30a as shown in FIG. 2B, the transmissivity of the color channel of the achromatic color is determined as 80% which corresponds to 95% of the transmissivity of the R channel. If the pixel B is the target for the process, based on the first LUT 30a as shown in FIG. 2B, the transmissivity of the color channel of the achromatic color is determined as 80% or 0.5% which corresponds to 0.6% of the transmissivity of the G channel.

Next, in Step S105, the control section 20 judges whether or not a plurality of the transmissivities was determined (Step S110). For example, if the pixel A is a pixel targeted for the process, it judges that a plurality of the transmissivities was not determined, and if the pixel B is a pixel targeted for the process, it judges that a plurality of the transmissivities was determined.

In Step S110, when it does not judge that the plurality of the transmissivities was determined, the control section 20 produces the first data to print the color material of the achromatic color corresponding to the transmissivity (the transmissivity that was determined in Step S105) which was determined as the brightest color channel (Step S115). That is, when the pixel targeted for the process is the pixel A, the transmissivity of the color channel of the achromatic color is 80% so that it produces the first print data of the pixel to print the W ink which is the ink to become 80% in the transmissivity of the pixel targeted for the process.

On the other hand, in Step S110, when it judges that the plurality of the transmissivities was determined, the control section 20 executes Steps S120 to S140. By the way, the process of Steps S120 to S130 is not executed when the transmissivity of the brightest color channel of the image data is 0.0% to 0.5% and 0.6% to 100%, and it is executed when the transmissivity of the brightest color channel of the image data is 0.5% to 0.6%. In Step S120, the control section 120 compares the transmissivities of the color channels of the pixel indicated by the image data and determines the transmissivity of the color channel of the achromatic color corresponding to the second brightest color channel based on the first LUT 30a. For example, when the pixel targeted for the process is the pixel B, the transmissivity of the color channel of the achromatic color is determined as 0.5% which corresponds to 0.18% of the transmissivity of the second brightest B channel based on the first LUT 30a as shown in FIG. 2B.

Next, the control section 20 compares the transmissivities of the color channels of the pixel indicated by the image data and determines the transmissivity of the color channel of the achromatic color corresponding to the third brightest color channel based on the first LUT 30a (Step S125). For example, when the pixel targeted for the process is the pixel B, the transmissivity of the color channel of the achromatic color is determined as 0.5% which corresponds to 0.01% of the transmissivity of the third brightest R channel based on the first LUT 30a as shown in FIG. 2B.

Next, among the transmissivities of the color channels of the achromatic colors determined by Steps S150, S120, and S125, the control section 20 produces the first print data to print the color material of the achromatic color corresponding to the largest transmissivity of the common transmissivity in all color channels of the image data (Step S130). In the present example, the above described Step S130 is executed when the plurality of the transmissivities for the brightest color channel of the image data in Step S 110 was determined. In the present example that determines the transmissivity of the color channel of the achromatic color corresponding to the transmissivity of the brightest color of the image data based on the first LUT 30a, the transmissivity of the brightest color channel of the image data needs to be included between 0.5% to 0.6% (brightness regions $R_3$ and $R_4$) to determine the plurality of the transmissivities. Here, when the transmissivity of the brightest color channel of the image data is $T_1$, the transmissivity of the second brightest color channel of the image data is $T_2$, and the transmissivity of the third brightest color channel of the image data is $T_3$, the combination of the transmissivities $T_1$, $T_2$, $T_3$ in each color channel of the image data can be as follows.

1) $T_1$: any value of 0.5% to 0.6%
$T_2$: $T_1 \geq T_2$ and any value of 0.5% to 0.6%
$T_3$: $T_2 \geq T_3$ and any value of 0.5% to 0.6%
2) $T_1$: any value of 0.5% to 0.6%
$T_2$: $T_1 \geq T_2$ and any value of 0.5% to 0.6%
$T_3$: any value of 0.0% to 0.5%
3) $T_1$: any value of 0.5% to 0.6%
$T_2$: any value of 0.5% to 0.6%
$T_3$: $T_2 \geq T_3$ and any value of 0.0% to 0.5%

And, in the respective cases, the transmissivities of the color channels of the achromatic colors corresponding to the transmissivities of the color channels of the image data are as follows.

1) $T_1$: 0.5% or 80%
$T_2$: 0.5% or 80%
$T_3$: 0.5% or 80%
2) $T_1$: 0.5% or 80%
$T_2$: 0.5% or 80%
$T_3$: 0.5%
3) $T_1$: 0.5% or 80%
$T_2$: 0.5%
$T_3$: 0.5%

Accordingly, in case 1), the transmissivities of the color channels of the achromatic colors determined in Steps S105, S102, and S125 are 0.5% or 80%, and among them, the common transmissivity in all of the color channels of the image data is 0.5% or 80%. And, the largest transmissivity among them is 80%. Therefore, in case 1), the first print data of the pixel B is produced to print the W ink corresponding to 80%. In case 2), the transmissivities of the color channels of the achromatic colors determined in Steps S105, S120, and S125 are 0.5% or 80%, and among them, the common transmissivity in all of the color channels of the image data is 0.5%. And, the largest transmissivity among them is inevitably 0.5%. In case 2), the first print data of the pixel B is produced to print the $K_2$ ink corresponding to 0.5%.

In case 3), the transmissivities of the color channels of the achromatic colors determined in Steps S105, S120, and S125 are 0.5% or 80%, and among them, the common transmissivity of all of the color channels of the image data is 0.5%. And, the largest transmissivity among them is inevitably 0.5% so that the first print data of the pixel B is produced to print the $K_2$ ink corresponding to 0.5%. By the way, when a pixel targeted for the process is the pixel B, it corresponds to the above described case 3) such that the transmissivities $T_1$, $T_2$, and $T_3$ in each color channel of the image data are 0.5%, 0.5%, and 0.5%, respectively so that the first print data of the pixel B is produced to print the $K_2$ ink which corresponds to 0.5%.

As described above, when the transmissivities of the color channels of the achromatic colors are determined and the first print data is produced, next, the control section 20 starts producing the second print data. That is, the control section 20 repeats Steps S145 to S170 in one of the unprocessed channels among the respective color channels of the image data as a color channel targeted for the process. For example, a color channel targeted for the process is set in the order of the respective color channels of the RGB so as to perform a loop process of Steps S145 to S170.

Concretely, the control section 20 determines the transmissivities of the color channels of the chromatic colors corresponding to the combination of the transmissivities of the color channels of the achromatic colors and the transmissivities of the color channels, which are targeted for the process, of the image data (Step S145). For example, when a pixel targeted for the process is the pixel A and the R channel is a color channel targeted for the process, based on the first LUT 30a, the transmissivity of the color channel of the chromatic color is determined as 95% which is the transmissivity of the R' channel corresponding to the combination of 80%, which is the transmissivity of the color channel of the achromatic color, and 95%, which is the transmissivity of the R channel of the image data. When a pixel targeted for the process is the pixel B and the R channel is a color channel targeted for the process, based on the first LUT 30a, the transmissivity of the color channel of the chromatic color is determined as 2.158% which is the transmissivity of the R' channel corresponding to the combination of 0.5%, which is the transmissivity of the color channel of the achromatic color, and 0.01%, which is the transmissivity of the R channel of the image data. The above example is an example that the transmissivity of the color channel of the chromatic color is determined based on the first LUT 30a. On the other hand, when a pixel targeted for the process is the pixel A and the B channel is a color channel targeted for the process, based on the first LUT 30a, the process is attempted to determine a value corresponding to the combination of 80%, which is the transmissivity of the color channel of the achromatic color, and 0.18%, which is the transmissivity of the B channel of the image data. However, in the examples as shown in FIG. 2B, it does not disclose a value for such combination in the first LUT 30a. Accordingly, in the case of the process in Step S145, the transmissivity of the B' channel as the transmissivity of the color channel of the chromatic color is not determined.

Next, the control section 20 judges whether or not the transmissivity was determined by the process of Step S145 (Step S150). When it judges that the transmissivity was determined, the control section 20 determines the transmissivities of the color channels of the chromatic colors in the determined transmissivities (Step S155). For example, when a pixel targeted for the process is the pixel A and the R channel is a color channel targeted for the process, the transmissivity of the R channel as the transmissivity of the color channel of the chromatic color is determined as 95%. When a pixel targeted for the process is the pixel B and the R channel is a color channel targeted for the process, the transmissivity of the R' channel as the transmissivity of the color channel of the chromatic color is determined as 2.158%.

On the other hand, when it does not judge that the transmissivity was determined in Step 150, the transmissivities of the color channels of the chromatic colors are determined in the minimum value provided by the first LUT 30a (Step S160). By the way, the minimum value means the possible minimum transmissivity when the first print layer is printed by the first print data that has already been determined. For example, when a pixel targeted for the process is the pixel A and the B channel is a color targeted for the process, the transmissivity of the B' channel is not determined as the transmissivity of the color channel of the chromatic color in Step S145 so that on the condition that the transmissivity of the color channels of the achromatic color that has already been determined in Step S105 is 80%, the transmissivity of the B' channel as the transmissivity of the color channel of the chromatic color is 0.5% which is the possible minimum transmissivity when the transmissivity of the color channel of the achromatic color is 80%.

Next, the control section 20 judges whether or not the process that determines the transmissivities of all color channels of the RGB targeted for the process is end (Step S170). When it does not judge that the process is end for the all channels, it changes the color channels targeted for the process to the unprocessed color channels, and the process after Step S145 is repeated. On the other hand, in Step S170, when it judges that the process is end for the all channels, this is the condition that the transmissivities of the color channels of the achromatic colors in the pixel targeted for the process and the transmissivities of the all channels of the chromatic colors were determined. For example, when a pixel targeted for the process is the pixel A, the transmissivity of the color channel of the achromatic color is 80% and the transmissivities of the color channels of the chromatic colors are 95%, 5%, and 0.5% in R', G', and B', respectively. When a pixel targeted for the process is the pixel B, the transmissivity of the color channel of the achromatic color is 0.5% and the transmissivities of the color channels of the chromatic colors are 2.158%, 100%, and 0.1518% in R', G', and B', respectively.

Next, the control section 20 produces the second print data corresponding to the transmissivities of the respective color channels of the chromatic colors based on the second LUT 30b (Step S175). That is, the control section 20 convers the transmissivities of the respective color channels of the R'G'B' to the data specifying the amount of the respective inks of $CMYK_1$ by reviewing the second LUT 30b, and it produces the second print data of a pixel targeted for the process.

When the above process was performed, this is the condition that the first print data and the second print data are produced for the pixel targeted for the process. Then, the control section 20 judges whether or not the process for producing the first print data and the second print data for all pixels was end (Step S180). The process after Step S100 is repeated until it judges that the process for all pixels was end. When the process for all pixels was end, the production of the first print data and the second print data is end.

(3) Other Embodiments:

The embodiment described above is the one example to perform the invention. When the brightness of the first pixel indicated by the image data is included in the first brightness region and the brightness of the second pixel is included in the second brightness region which is darker than the first brightness region, in a case that the brightness of the first print layer corresponding to the first pixel becomes brighter than the first print layer corresponding to the second pixel, the following modified example can be appropriately combined or it can be possible to apply various other embodiments. For example, the printing device 10 can include the printing section 41, and in a configuration that the printer is connected to the computer, the printer as the printing section can be controlled by the computer as the printing device.

In addition, it is not limited to individually use two color inks to form the first print layer so that three, four, or more color inks can be individually used for forming the first print layer. Also, among them, at least one of the inks can be mixed with more than two types of inks and at least a part of the first print layer can be formed by using the mixed ink. Here, the inks that are more than two types are the color inks, and by using them, the printing the achromatic colors can be performed. FIG. 7A is the drawing showing an example of the first LUT 30a when the first print layer is formed by adding three color inks of white, black, and gray. FIG. 7B is the drawing showing the correspondence relationship of the transmissivities indicated by the first LUT 30a. As shown in FIG. 7A, the color channels of the achromatic colors are 80%, 4.0%, and 0.5%. Accordingly, in this example, when the first print layer was printed, by the printing section 41, it is possible to print three color inks in the transmissivities of 80%, 4%, 0.5%, respectively. By using the first LUT 30a and executing the print data producing process in the same manner as shown in FIGS. 5 and 6, it can be possible to express the extreme dark color with the rich gradation which was not realized when the first print layer was printed by only the W ink.

However, when the first print layer is formed by more than three color inks, the common transmissivity in all color channels of the image data can not be determined in Steps S105, S120, and S125 so that in this case, the exceptional process in Step S130 of FIG. 5 can be performed. FIG. 7C is a schematic drawing showing a condition that the transmissivities of the image data shown in FIG. 7A are superimposed. In a condition that the change of the transmissivity per unit length is uneven, it shows that the condition of the superposition of the transmissivity is emphasized. That is, the upper, middle, and lower shown by the arrows in a solid line indicate a range of the transmissivities of the image data corresponding to the transmissivities of the color channels of the achromatic colors such that the transmissivities become 0.5% in $K_2$ ink, 4.0% in Gr ink (gray ink), and 80% in the W ink.

By the way, the values shown in the upper corner of the arrows of the solid line are the transmissivities (%), and the lower side of the arrows of the solid line shows symbols that refer to the regions divided in response to the degree of the overlapping in a range of the transmissivity. That is, when the respective regions are divided in response to the degree of the overlapping in a range of the transmissivities as shown by the dash lines, it categorizes that the ranges of the transmissivities corresponding to the W ink are the region $R_{11}$ of 5.0% to 100%, the region $R_{12}$ of 0.6% to 5.0%, and the region $R_{13}$ of 0.5% to 0.6%, the ranges of the transmissivities corresponding to the Gr ink are the region $R_{21}$ of 0.6% to 5.0%, the region $R_{22}$ of 0.5% to 0.6%, and the region $R_{23}$ of 0.02% to 0.5%, and the ranges of the transmissivities corresponding to $K_2$ ink are the region $R_{31}$ of 0.5% to 0.6%, the region $R_{32}$ of 0.02% to 0.5%, and the region $R_{33}$ of 0.0% to 0.02%.

In these examples, the print data producing process is performed in the same manner as shown in FIGS. 5 and 6. By the judgment of Step S110, when the transmissivity of the brightest color channel of the image data is included in the region R33 or the region R11, Steps S120 to S130 are not executed, and Steps S120 to S130 are executed in another case. Another case means the case that the transmissivity of the brightest color of the image data is 0.02% to 5.0%. In this case, regardless of any value of the transmissivity in the brightest color channel, 4.0% which is the transmissivity of the Gr ink is included as the transmissivity of the color channel of the achromatic color in Step S105.

And, regardless of any values of the transmissivity of the second brightest color channel of the image data and the transmissivity of the third brightest color channel of the image data, in the nearly all cases, 4.0% which is the transmissivity of the Gr ink is determined as the transmissivity of the color channel of the achromatic color in both the transmissivity of the second brightest color of the image data and the transmissivity of the third brightest color of the image data. As a result, since the common transmissivity of all color channels of the image data is determined, the first print data can be produced by determining the transmissivities of the color channels of the achromatic colors in the same process of Step S130 which is explained in the above described embodiment.

However, in a specific case, for example, when the transmissivity of the second brightest color channel of the image data is included in the region $R_{23}$ and the transmissivity of the third brightest color channel of the image data is included in the region $R_{33}$, the transmissivity of the color channel of the achromatic color corresponding to the transmissivity of the third brightest color channel is 0.5%. Accordingly, this is the exception that the common transmissivity in all color channels of the image data is not determined. Thus, in this case, the transmissivities of the color channels of the achromatic colors are determined by performing a process for the exception. For example, even though the transmissivity of the brightest color channel of the image data and the transmissivity of the second brightest color channel of the image data are determined as 80% and 4.0%, to minimize the error from 0.5% which is the transmissivity of the third brightest color channel, 4.0% is selected instead of selecting 80% so that it can be possible to produce the first print data to print the Gr ink.

Obviously, in a configuration to determine the transmissivities of the color channels of the achromatic colors corresponding to the transmissivity in each color channel of the image data, it can be possible to have various configurations other than the above configuration. When it is possible to select a plurality of the transmissivities (plural colors of inks) as the transmissivities of the color channels of the achromatic colors, the smallest transmissivity can be selected or when it is possible to select more than three transmissivities, the transmissivity which is the closest to the average transmissivity can be selected. Also, when the transmissivity of the color channel of the achromatic color has already been determined for one pixel, the transmissivities of the color channels of the achromatic colors can be determined so as to become smaller difference with the transmissivity that has already been determined.

In addition, in the above described embodiments, the regions ($R_3$, $R_4$, or the like as described above) were set so that it is possible to select a plurality of the transmissivities as the transmissivities of the color channels of the achromatic colors corresponding to the transmissivity of each color channel of the image data, but the first LUT 30a can be defined such that the transmissivity of each color channel of the image data and the transmissivities of the color channels of the achromatic colors are corresponded as one-on-one without setting the regions that is possible to select the plurality of the transmissivities.

Furthermore, as described above, the transmissivity in the first print layer can be realized by selecting the color material of the achromatic color, but it can be other configurations. For example, when it is possible to print the first print layer by changing the thickness of the color material in each position of the printing section, it can have a configuration to produce the first print data that indicates the amount of the color materials of the achromatic colors, which should be printed in the respective pixels, so that the thickness of the color material of the achromatic color printed in the first pixel is thinner than the thickness of the color material of the achromatic color printed in the second pixel. Moreover, in the printing section, when it is possible to print the color materials of the achromatic colors in the plural colors in the same pixel, or when it is possible to express the gradation in the number of the color materials of the achromatic colors and the concentration that are printed in the specific area of the region, it can have a configuration to adjust in the multiple steps so that the transmissivities of the color channels of the achromatic colors increase in response to the increase of the transmissivities of the image data.

Also, the RGB of the obtained image data is converted to an independent format of the luminance components such as YCbCr, and the luminance components are divided into the transmissivity of the first print layer and the transmissivity of the second print layer by using the first LUT so that it can produce the print data for the second print layer by using the second LUT which is from the transmissivity of the second print layer and the remaining components (for example, CbCr). Also, it explained that the first LUT and the second LUT were used, but it can use other methods such that it can be consolidated into one LUT, or at least one of the LUTs is not used and the calculating formula that is preliminary stored can be used. Also, it can be applied when a monochrome image is printed. Also, the number of the gradation in the first print layer that prints the color materials of the achromatic colors can be less than the second print layer, and the first print layer can be printed in a rough resolution than the second print layer. Also, the control level that selects the color materials of the achromatic colors in the first print layer can be not so strict, and the region that prints the first print layer in one color material can not be totally corresponded to the brightness of the pixel of the original data. In the borderline region that should be printed by using a plurality of the color materials of the achromatic colors (for example, color materials A and B), the region that should be printed by using the A color material based on the pixel of the original data, but the B color material can be used. In other words, in at least a part of the borderline region printed by using the plurality of color materials of the achromatic colors, the relationship between the brightness of the pixel and the brightness of the first layer corresponding to the pixel can be different from the relationship of the other region.

What is claimed is:

1. A printing device comprising:
    an image data acquiring section that acquires an image data including a first pixel and a second pixel;
    a print data producing section that produces a first print data to perform printing to a first layer by using at least color materials of achromatic colors, and produces a second print data to perform printing to the second layer that is superimposed with the first layer based on the image data; and
    a print control section that controls a printing section based on the first print data and the second print data;
    wherein when the brightness of the first pixel is brighter than the brightness of the second pixel, the print data producing section produces the first print data so that the brightness of the first layer corresponding to the first pixel becomes brighter than the brightness of the first layer corresponding to the second pixel.

2. The printing device according to claim 1, wherein the printing section is printable for a plurality of color materials of the achromatic colors in different brightness,
    the print data producing section produces the first print data to identify the color materials of the achromatic colors that should be printed in each pixel so that the brightness of the color material of the achromatic color printed in the first pixel becomes brighter than the brightness of the color material of the achromatic color printed in the second pixel.

3. The printing device according to claim 2, wherein the print data producing section converts colors of the pixels indicated by the image data to achromatic colors and chromatic colors that correspond to the colors, and after the conversion, the print data producing section produces the first print data that specifies an amount of the color materials of the achromatic colors for printing the achromatic colors and also produces the second print data that specifies an amount of the plural colors of the color materials that include the chromatic colors for printing the chromatic colors.

4. The printing device according to claim 3, wherein a transmissivity of the color channel of the achromatic color corresponding to a transmissivity of the brightest color channel among the color channels of the achromatic colors indicated by the image data is identified based on a lookup table that indicates a correspondence relationship of a transmissivity of each color channel of the pixel indicated by the image data, transmissivities of the color channels of the achromatic colors indicating colors printed in the first layer, and transmissivities of the color channels of the chromatic colors indicating colors printed in the second layer so that the print data producing section produces the first print data for printing the color materials of the achromatic colors having the identified transmissivities, and
    wherein based on the lookup table, the transmissivities of the color channels of the chromatic colors corresponding to combinations of the transmissivities of the respective color channels of the pixels indicated by the image data and the transmissivities of the color channels of the achromatic colors are identified in the respective color channels so that the print data producing section produces the second print data for printing the plural colors of the color materials that include the chromatic colors having the identified transmissivities.

5. The printing device according to claim 1, wherein the printing section is printable for a plurality of the color materials of the achromatic colors in different brightness, the first layer is printed by using the achromatic colors that were selected in response to a brightness region of a pixel included in the image data.

6. The printing device according to claim 1, wherein the printing section is printable for a plurality of the color materials of the achromatic colors in different brightness, in at least a part of a borderline region that is printed by the plurality of the color materials of the achromatic colors, a relationship between the brightness of the pixels and the brightness of the first layer corresponding to the pixels is different from another region.

7. The printing device according to claim 1, wherein the printing section is printable for the first layer in which the thickness of the color materials of the achromatic colors is changed in each position, the print data producing section produces the first print data that specifies an amount of the color materials of the achromatic colors that should be printed in the respective pixels so that a thickness of the color material of the achromatic color printed in the first pixel is thinner than a thickness of the color material of the achromatic color printed in the second pixel.

8. The printing device according to claim 1, further comprising the printing section that prints the first layer and the second layer.

9. A method of producing a printing material in which a color material is printed to a print medium comprising:

an image data acquiring process that acquires an image data;

a print data producing process that produces a first print data providing a brightness of a first print layer corresponding to a first pixel which is brighter than a brightness of the first print layer corresponding to a second pixel and produces a second print data to perform printing by using the color material to the second print layer that is superimposed with the first print layer, so that based on the image data, the first print data and the second print data are produced when the first print data is provided to perform printing in the first print layer by using at least color material of an achromatic color and when the brightness of the first pixel indicated by the image data is included in a first brightness region and the brightness of the second pixel is included in a second brightness region which is darker than the first brightness region; and a print control process that prints the first print layer and the second print layer by controlling a printing section based on the first print data and the second print data.

10. An image generator comprising:

an image data acquiring section that acquires an image data; and an image generating section that produces a first image to a first layer based on brightness of the image data and produces a second image to a second layer that is superimposed with the first layer based on the image data, wherein a pixel of the second image which is based on a pixel of the image data is superimposed with a pixel of the first image which is based on the same pixel of the image data.

11. The image generator according to claim 10, wherein when the image data includes a first pixel and a second pixel with the brightness of the first pixel being brighter than the brightness of the second pixel, the image data acquiring section acquires the image data in which the brightness of the first layer corresponding to the first pixel is brighter than the brightness of the first layer corresponding to the second pixel.

12. The image generator according to claim 10, wherein the image data acquiring section acquires the image data in which at least one of a gradation value and a resolution is smaller in the first layer than in the second layer.

13. The image generator according to claim 10, further comprising a print control section that outputs the first image and the second image to a printing section so that pixels produced based on the same image are superimposed with each other.

14. A method of generating an image data comprising:

an image data acquiring process that acquires an image data; and an image data producing process that produces data of a first image, for a first layer, based on brightness of the image data and produces data of a second image, for a second layer that is superimposed with the first layer, based on the image data, wherein a pixel of the second image which is based on a pixel of the image data is superimposed with a pixel of the first image which is based on the same pixel of the image data.

15. The method of generating an image data according to claim 14, wherein the image data acquiring process includes acquiring the image data including a first pixel and a second pixel with the brightness of the first pixel being brighter than the brightness of the second pixel, and the image data producing process includes producing the first image data in which the brightness of the first layer corresponding to the first pixel is brighter than the brightness of the first layer corresponding to the second pixel.

16. The method of generating an image data according to claim 14, wherein the image data producing process includes producing the first image data and the second image data so that at least one of a gradation value and a resolution is smaller in the first layer than in the second layer.

17. The method of generating an image data according to claim 14, further comprising a print control process that outputs the first image and the second image to a printing section so that pixels produced based on the same image are superimposed with each other.

* * * * *